(12) United States Patent
Li et al.

(10) Patent No.: US 12,286,947 B2
(45) Date of Patent: Apr. 29, 2025

(54) INTAKE MANIFOLD FOR ENGINE, ENGINE, AND VEHICLE

(71) Applicant: BYD COMPANY LIMITED, Guangdong (CN)

(72) Inventors: Li Li, Shenzhen (CN); Nan Zhang, Shenzhen (CN); Shiyi Pan, Shenzhen (CN); Peng Guo, Shenzhen (CN); Kuicong He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/234,034

(22) Filed: Aug. 15, 2023

(65) Prior Publication Data

US 2023/0383712 A1 Nov. 30, 2023

Related U.S. Application Data

(63) Continuation of application No. PCT/CN2022/072822, filed on Jan. 19, 2022.

(30) Foreign Application Priority Data

Mar. 1, 2021 (CN) .......................... 202110224846.3

(51) Int. Cl.
*F02M 35/10* (2006.01)
*F02M 35/104* (2006.01)

(52) U.S. Cl.
CPC .... *F02M 35/104* (2013.01); *F02M 35/10045* (2013.01); *F02M 35/10091* (2013.01); *F02M 35/10222* (2013.01)

(58) Field of Classification Search
CPC . F02M 35/10222; F02M 35/104; F02M 26/19
(Continued)

(56) References Cited

U.S. PATENT DOCUMENTS 6,807,957 B2 * 10/2004 Ko .................... F02M 35/10222
123/184.21
11,261,770 B1 * 3/2022 Delleree ............... F01N 3/2013
(Continued)

FOREIGN PATENT DOCUMENTS

| CN | 101828023 A | 9/2010 |
|---|---|---|
| CN | 101994618 A | 3/2011 |

(Continued)

OTHER PUBLICATIONS

International Search Report and Written Opinion for Application No. PCT/CN2022/072822, mailed on Apr. 27, 2022, 11 pages.

*Primary Examiner* — Long T Tran
*Assistant Examiner* — James J Kim

(57) ABSTRACT

An intake manifold for an engine includes a premixing chamber, a pressure stabilizing chamber, and multiple intake passages. The intake passages are connected with a bottom of the pressure stabilizing chamber. A first end of the premixing chamber includes an intake end having an air inlet. A second end of the premixing chamber is communicated with the pressure stabilizing chamber and is close to a top of the pressure stabilizing chamber. An exhaust gas inlet is disposed on the premixing chamber and close to the air inlet. The engine includes an engine body and the intake manifold for the engine. The vehicle includes a vehicle body and the engine.

20 Claims, 6 Drawing Sheets

(58) Field of Classification Search
USPC .................................................. 123/184.21
See application file for complete search history.

(56) References Cited

U.S. PATENT DOCUMENTS

| | | | |
|---|---|---|---|
| 2010/0288228 A1 | 11/2010 | Puschnik et al. | |
| 2011/0226218 A1 | 9/2011 | Vongsateanchai et al. | |
| 2012/0291741 A1* | 11/2012 | Ito .................. | F02M 35/10209 |
| | | | 123/184.47 |
| 2014/0326226 A1* | 11/2014 | Senda ............. | F02M 35/10268 |
| | | | 123/573 |
| 2017/0002776 A1* | 1/2017 | Sun ................. | F02M 35/10222 |
| 2017/0306901 A1* | 10/2017 | Mammarella .... | F02M 35/10321 |
| 2021/0317805 A1* | 10/2021 | Kato ............... | F02M 26/41 |
| 2022/0298992 A1* | 9/2022 | Ohashi ............ | F02M 26/17 |
| 2023/0134530 A1* | 5/2023 | Thomas ........... | F02M 26/19 |
| | | | 123/184.21 |

FOREIGN PATENT DOCUMENTS

| | | |
|---|---|---|
| CN | 103670833 A | 3/2014 |
| CN | 105089879 A | 11/2015 |
| CN | 105422327 A | 3/2016 |
| CN | 205977485 U | 2/2017 |
| CN | 106677932 A | 5/2017 |
| CN | 109209698 A | 1/2019 |
| CN | 208950736 U | 6/2019 |
| CN | 210660360 U | 6/2020 |
| CN | 210686156 U | 6/2020 |
| CN | 212406912 U | 1/2021 |
| EP | 3255273 A1 | 12/2017 |
| JP | H10196474 A | 7/1998 |
| JP | 2019065808 A | 4/2019 |
| KR | 20040089463 A | 10/2004 |
| KR | 101137820 B1 | 4/2012 |

* cited by examiner

INTAKE MANIFOLD FOR ENGINE, ENGINE, AND VEHICLE

CROSS-REFERENCE TO RELATED APPLICATION

This application is a Continuation Application of International Patent Application No. PCT/CN2022/072822, filed on Jan. 19, 2022, which is based on and claims priority to and benefits of Chinese Patent Application No. 202110224846.3, filed on Mar. 1, 2021. The entire content of all of the above-referenced applications is incorporated herein by reference.

FIELD

The present disclosure relates to the engine field, and particularly to an intake manifold for an engine, an engine, and a vehicle.

BACKGROUND

As a component of an engine, an intake manifold can mix fresh air with exhaust gas of exhaust gas re-circulation (EGR), distribute the mixture to intake passages, so that the mixture enters the cylinder of the engine. Therefore, the design of intake manifold has an important impact on the performance of the engine.

At present, in the related art, an exhaust gas inlet is generally designed above a pressure-stabilizing chamber of an intake manifold pipeline. Because of the limited volume of the pressure-stabilizing chamber, there is a risk that the exhaust gas entering the pressure-stabilizing chamber cannot be uniformly mixed fresh air. Moreover, due to the high temperature of the exhaust gas, the accuracy of pressure and temperature sensors is affected to a certain extent, resulting in an erroneous judgment of the control module, and affecting the normal operation of the engine. To solve this problem, in some engines, the intake manifold is equipped with a premixing chamber. However, due to the improper design of the premixing chamber, a large amount of oil emulsions and condensed water is likely to accumulate in the premixing chamber at low temperature, affecting the combustion performance of the engine.

SUMMARY

To solve at least one of the above technical problems, the present disclosure provides an intake manifold for an engine, an engine, and a vehicle, where the mixing uniformity of exhaust gas and fresh air is improved by using a premixing chamber, and oil emulsions and condensed water generated in the premixing chamber can flow into a cylinder to participate in combustion, thereby effectively reducing the accumulation phenomenon and improving the engine performance.

The following technical solutions are employed in the present disclosure. An air intake manifold for an engine includes a premixing chamber, a pressure stabilizing chamber, and a plurality of intake passages. The intake passages are connected with a bottom of the pressure stabilizing chamber. A first end of the premixing chamber includes an intake end having an air inlet, and a second end of the premixing chamber is communicated with the pressure stabilizing chamber and close to a top of the pressure stabilizing chamber. An exhaust gas inlet is disposed on the premixing chamber and close to the air inlet.

In a further embodiment, a partition structure is configured to increase a traveling distance of gas in the premixing chamber, and is disposed at a joint between the premixing chamber and the pressure stabilizing chamber.

In a further embodiment, the partition structure includes a partition plate, a first side of the partition plate is connected with the premixing chamber, a second side of the partition plate includes a guiding structure, and the guiding structure is configured to guide gas in the pressure stabilizing chamber to enter the intake passages.

In a further embodiment, the first side of the partition plate includes a guiding surface and a connecting surface connected with the premixing chamber, and the guiding surface is configured to guide the gas in the premixing chamber to the pressure stabilizing chamber.

In a further embodiment, the guiding surface is of a circular arc shape.

In a further embodiment, the guiding structure includes a guiding plate vertically disposed along an edge of the second side of the partition plate and facing the pressure stabilizing chamber, and includes a reinforcing rib connected with the guiding plate and the partition plate.

In a further embodiment, the guiding plate and the reinforcing rib are of a circular arc shape.

In a further embodiment, an embedding structure configured to embed the partition plate in the premixing chamber is disposed at a top end of the partition plate.

In a further embodiment, the intake passages are disposed along a length direction of the pressure stabilizing chamber, and the intake end extends along the length direction of the pressure stabilizing chamber and is bent toward the bottom of the pressure stabilizing chamber.

In a further embodiment, the air inlet and the exhaust gas inlet are disposed on two opposite sides of the intake end.

In a further embodiment, the premixing chamber includes a carbon canister desorption port and a positive crankcase ventilation valve vent.

In a further embodiment, one of the intake passages includes a first pipe portion, a circular arc portion, and a second pipe portion sequentially communicated with each other, the first pipe portion has a front end surface configured to connect to the pressure stabilizing chamber, the second pipe portion has a rear end surface configured to connect to a cylinder, and a cross-sectional area of the one of the intake passages gradually decreases from the front end surface of the first pipe portion to a first position located at the second pipe portion.

In a further embodiment, the first pipe portion and the second pipe portion are straight or quasi-straight, and lengths of intake paths of the first pipe portion, the circular arc portion, and the second pipe portion are approximately same.

In a further embodiment, a cross-sectional area of the one of the intake passages at the first position might be 70%-80% of a cross-sectional area of the front end surface of the first pipe portion, or the cross-sectional area of the one of the intake passages at the first position is about same as a cross-sectional area of the rear end surface of the second pipe portion.

In a further embodiment, the first position is located at a central position of the second pipe portion, or the circular arc portion is of an arc shape with a central angle of about 30-about 60 degree.

The present disclosure also provides an engine including an engine body and the above intake manifold for the engine.

The present disclosure also provides a vehicle, including a vehicle body, and the above intake manifold for an engine or the above engine.

According to the intake manifold for the engine, the engine, and the vehicle provided in the present disclosure, exhaust gas of EGR and fresh air can enter the premixing chamber through the exhaust gas inlet and the air inlet of the premixing chamber and be mixed in the premixing chamber. Then, the mixture enters the intake passages at the bottom of the pressure stabilizing chamber through the pressure stabilizing chamber to participate in the combustion of the engine. This can effectively improve the uniformity of mixing the exhaust gas and fresh air, and can prevent the exhaust gas from having an excessively high temperature to affect the normal operation of the sensor. In addition, oil emulsions and condensed water generated in the premixing chamber can enter the combustion chamber through the intake passages at the bottom of the pressure stabilizing chamber to participate in the combustion under the action of gravity, thereby effectively reducing the accumulation of oil emulsions and improving the engine performance.

BRIEF DESCRIPTION OF THE DRAWINGS

In order to more clearly explain the technical solutions in the embodiments of the present disclosure, the drawings used in the description of the embodiments will be briefly described below. Obviously, the drawings depicted below are merely embodiments of the present disclosure, and those skilled in the art can obtain other drawings based on these drawings without any creative efforts.

DETAILED DESCRIPTION

To make the objects, technical solutions, and advantages of the present disclosure clearer, the present disclosure is described in further detail with reference to accompanying drawings and examples. It should be understood that the embodiments described herein are merely used for explaining the present disclosure, and are not intended to limit the present disclosure.

It should be noted that the terms such as "arrange" and "connect" should be understood in a broad sense, for example, may be direct arrangement and connection, or may be indirect arrangement and connection via an intermediate component or an intermediate structure.

In addition, orientation or position relationships indicated by the terms such as "longitudinal", "transverse", "length", "width", "thickness", "on", "below", "front", "rear", "left", "right", "vertical", "horizontal", "top", "bottom", "inner", and "outer" in the embodiments of the present disclosure are based on orientation or position relationships shown in the accompanying drawings or a normal placement state or usage state, and are used only for ease and brevity of illustration and description, rather than indicating or implying that the mentioned structure, feature, apparatus, or component needs to have a particular orientation or position relationship or needs to be constructed and operated in a particular orientation. Therefore, such terms should not be construed as limiting of the present disclosure. In the description of the embodiments of the present disclosure, "multiple" and "a plurality of" mean two or more, unless otherwise particularly defined.

The technical features and embodiments described in the detailed description may be combined in any suitable manner without contradiction. For example, different implementations may be formed by combining different technical features/embodiments/implementations. Various possible combinations of the technical features/embodiments/implementations in the present disclosure will not be described in order to avoid unnecessary repetition.

Figure 1:
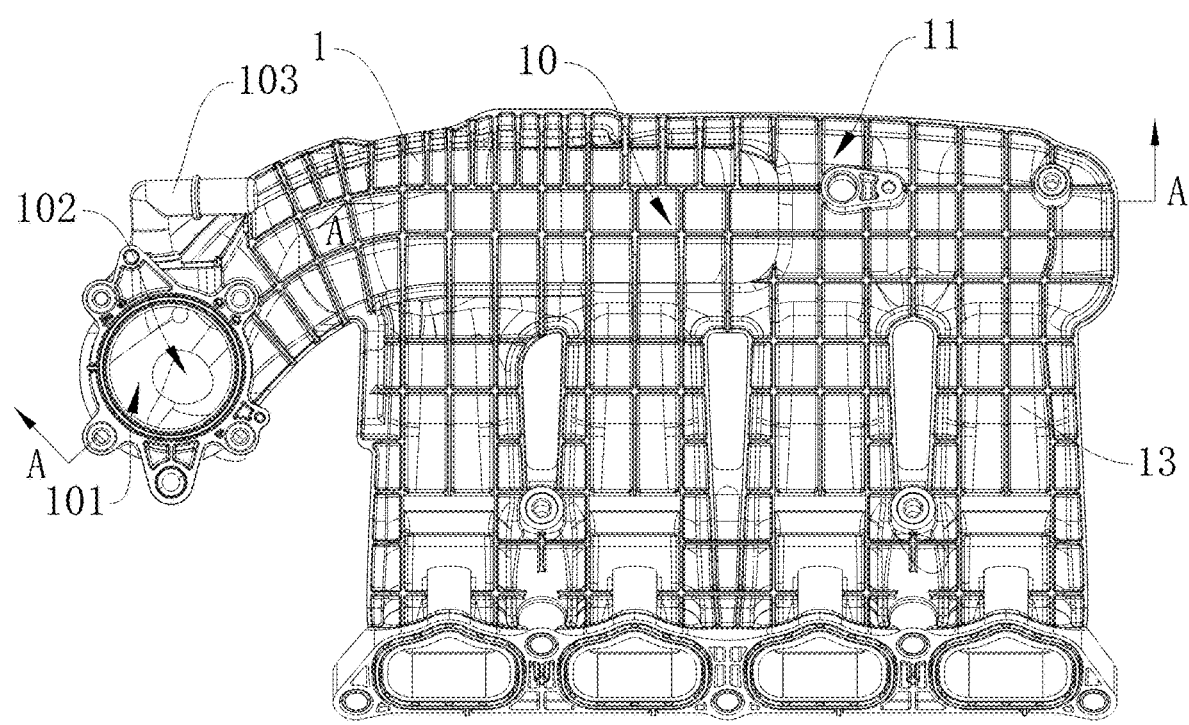
FIG. 1 is a front view of an intake manifold for an engine according to an embodiment of the present disclosure.
Figure 2:
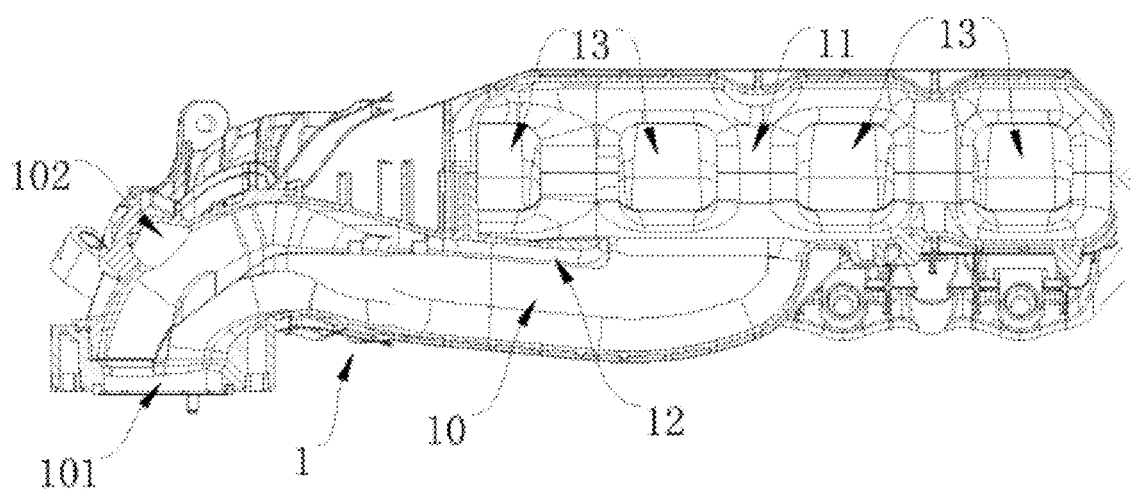
FIG. 2 is a cross-sectional view taken along line A-A in FIG. 1.
Figure 3:
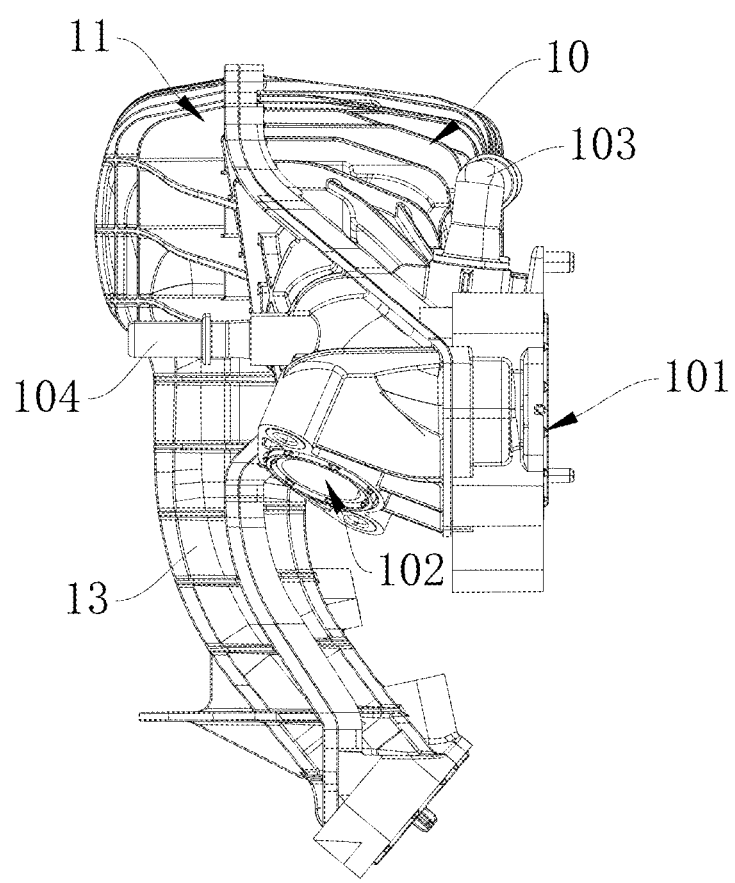
FIG. 3 is a side view of an intake manifold for an engine according to an embodiment of the present disclosure.

An embodiment of the present disclosure provides an intake manifold 1 for an engine. Referring to FIG. 1 to FIG. 3, the intake manifold 1 includes a premixing chamber 10, a pressure stabilizing chamber 11, and multiple intake passages 13. The intake passages 13 are connected with a bottom of the pressure stabilizing chamber 11. One end (e.g., a first end) of the premixing chamber 10 is an intake end having an air inlet 101. Another end (e.g., a second end) of the premixing chamber 10 is communicated with the pressure stabilizing chamber 11 and is close to a top of the pressure stabilizing chamber 11. An exhaust gas inlet 102 is arranged/disposed on the premixing chamber 10 and at a position close to the air inlet 101. In an embodiment, when the intake manifold 1 is used in an engine, fresh air may enter the premixing chamber 10 through the air inlet 101, and exhaust gas of EGR may enter the premixing chamber 10 through the exhaust gas inlet 102. The fresh air and the exhaust gas may be mixed in the premixing chamber 10, then enter the pressure stabilizing chamber 11, and then enter a cylinder through the intake passages 13 at the bottom of the pressure stabilizing chamber 11 to participate in combustion. The air inlet 101 and the exhaust gas inlet 102 are both close to the intake end of the premixing chamber 10, so that the fresh air and the exhaust gas can be mixed over a sufficient distance. In this way, the mixing uniformity of the gas (including the fresh air and the exhaust gas) can be improved, and the temperature of the gas can be reduced, to avoid an excessively high temperature which affects related pressure and temperature sensors, thereby improving the overall stability of the engine. Further, during the operation of the engine, because the other end of the premixing chamber 10 is close to the top of the pressure stabilizing chamber 11 in this embodiment, oil emulsions and condensed water generated in the premixing chamber 10 enter the cylinder through the pressure stabilizing chamber 11 and the intake passage 13 to participate in the combustion, thereby effectively avoiding the accumulation of the oil emulsions and condensed water in the premixing chamber 10 and ensuring the combustion performance of the engine. It should be noted, in this embodiment, that the other end of the premixing chamber 10 being close to the top of the pressure stabilizing chamber 11 may be that the premixing chamber 10 is located on one side (e.g., a first side) of the pressure stabilizing chamber 11, and the end of the premixing chamber 10 connected to the pressure stabilizing chamber 11 may be closer to the top of the first side, so that the product in the premixing chamber 10 can flow into the pressure stabilizing chamber 11. Of course, in some other embodiments, the premixing chamber 10 may be located at the top of the pressure stabilizing chamber 11.

Referring to FIG. 2, in this embodiment, a partition structure 12 is arranged/disposed at a joint between the premixing chamber 10 and the pressure stabilizing chamber 11, and the partition structure 12 is configured to prolong/increase a traveling distance of the gas in the premixing chamber 10. In an application, the partition structure 12 may be located at the joint between the premixing chamber 10 and the pressure stabilizing chamber 11, so that the traveling distance and time of the gas in the premixing chamber 10 can be prolonged/increased without increasing the length of the premixing chamber 10, i.e., without affecting the overall strength of the premixing chamber 10, thereby further improving the mixing uniformity of the gas and lowering the temperature of the gas.

Figure 4:
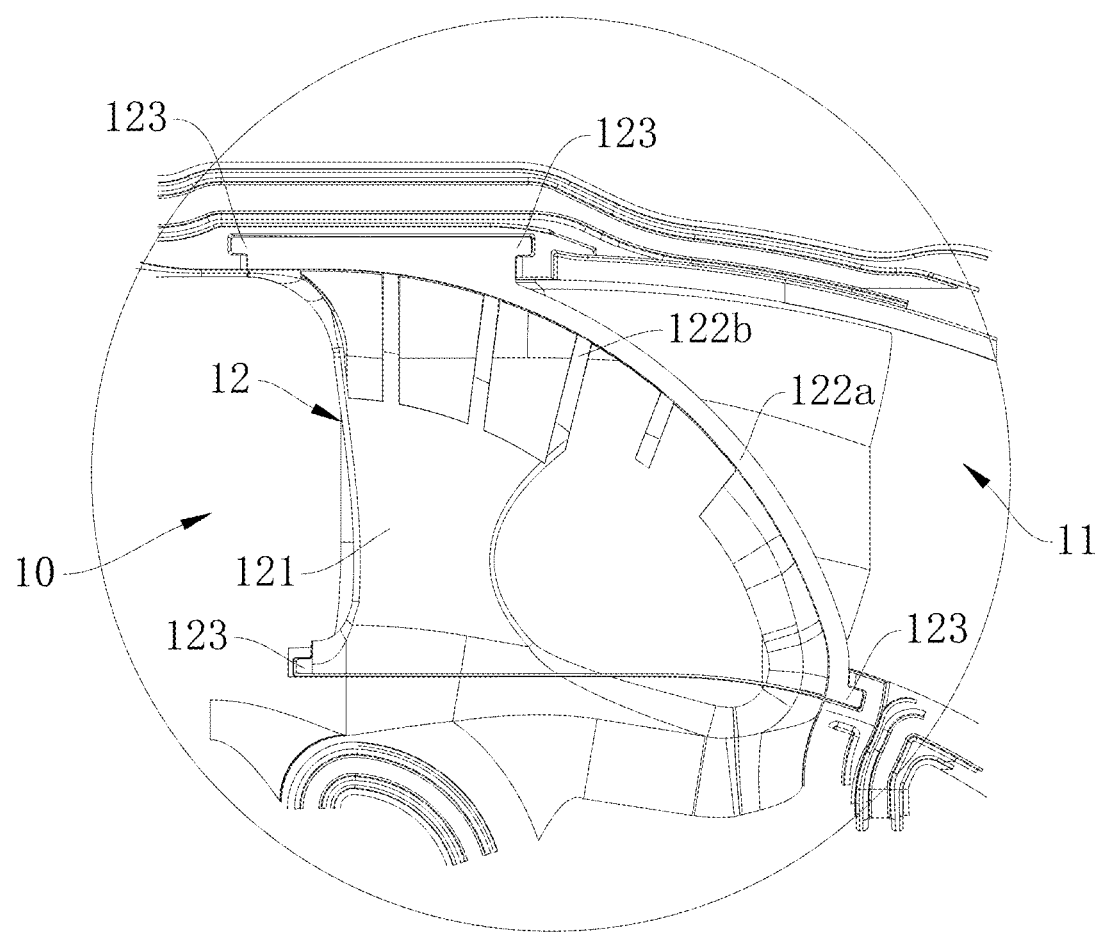
FIG. 4 is a schematic diagram showing a position of a partition plate in an intake manifold for an engine according to an embodiment of the present disclosure.
Figure 5:
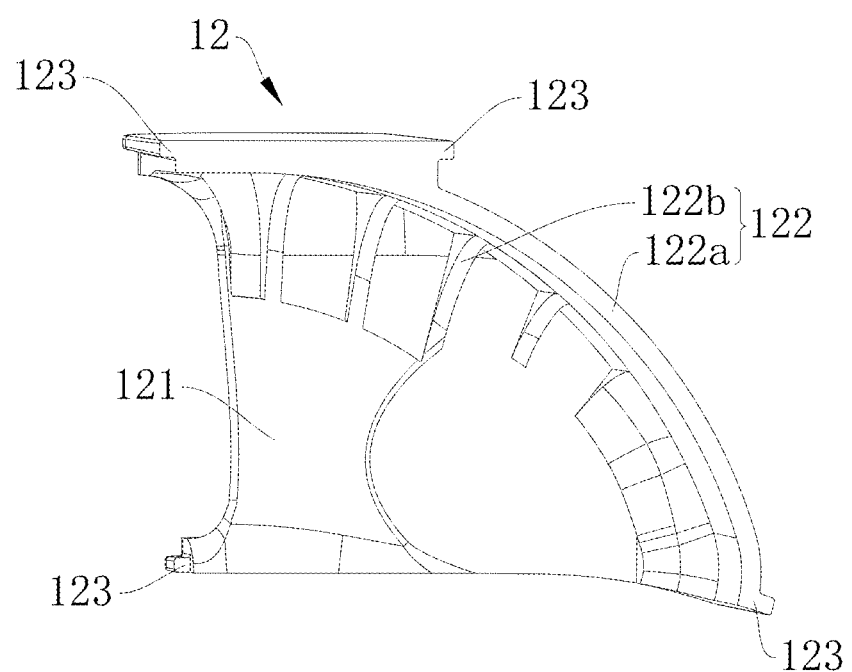
FIG. 5 is a front view of a partition plate in an intake manifold for an engine according to an embodiment of the present disclosure.
Figure 6:
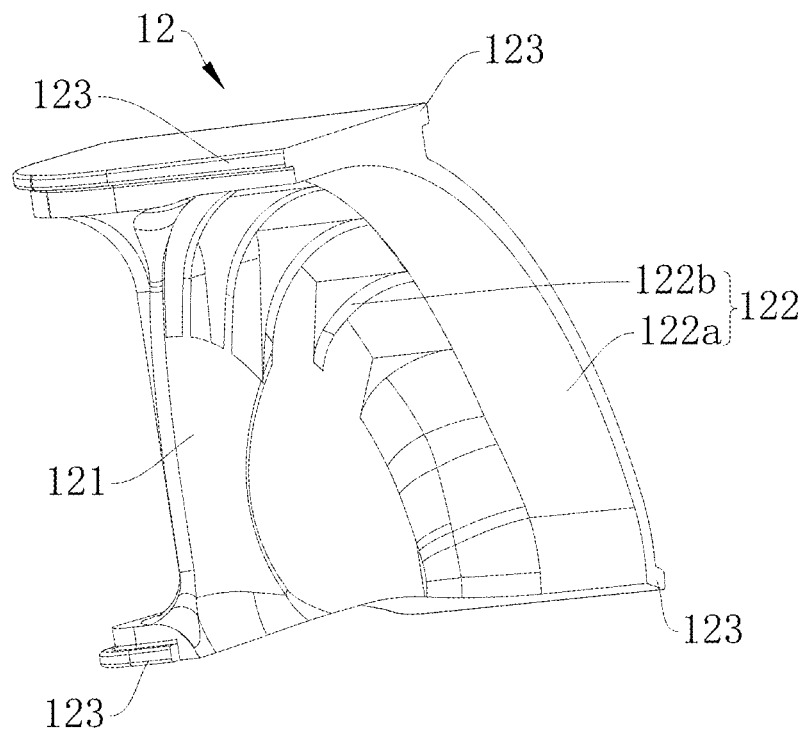
FIG. 6 is a schematic three-dimensional structural diagram of a partition plate in an intake manifold for an engine according to an embodiment of the present disclosure.

Referring to FIG. 4 to FIG. 6, in this embodiment, the partition structure 12 includes a partition plate 121, one side (e.g., a first side) of the partition plate 121 is a connecting side connected with the premixing chamber 10, another side (e.g., a second side) of the partition plate 121 is a guiding side having a guiding structure 122, and the guiding structure 122 is configured to guide the gas in the premixing chamber 10 to uniformly enter the intake passages 13. In an application, the engine may generally include multiple intake passages 13, for example, four intake passages in this implementation. When the gas in the premixing chamber 10 enters the pressure stabilizing chamber 11, the gas can uniformly enter the intake passages 13 under the action of the guiding structure 122 of the partition plate 121, thereby effectively alleviating the problem of non-uniform air intake of the intake passages 13.

Still referring to FIG. 5 and FIG. 6, further, the connecting side includes a connecting surface and a guiding surface. The guiding surface can guide the gas in the premixing chamber 10 into the pressure stabilizing chamber 11. In an embodiment, the guiding surface is smooth and flat, so that the gas in the premixing chamber 10 may stably flows to the pressure stabilizing chamber 11. Further, the guiding surface may be of a circular arc shape, to further improve the guiding effect of the guiding surface.

Still referring to FIG. 5 and FIG. 6, in this embodiment, the guiding structure 122 includes a guiding plate 122a and a reinforcing rib 122b. The guiding plate 122a may be arranged/disposed vertically along an edge of the guiding side and facing the pressure stabilizing chamber 11. The reinforcing rib 122b is connected with the guiding plate 122a and the partition plate 121. In this implementation, the reinforcing rib 122b and the guiding plate 122a may be of a circular arc shape. In some applications, when the gas enters the pressure stabilizing chamber 11, the arc of the guiding plate 122a may be 80-100 degree, and the number of reinforcing ribs 122b may be 3-8. This ensures that the non-uniformity of the air intake in the intake passages 13 is within 5%, thereby effectively improving the combustion consistency of the engine.

Still referring to FIG. 5 and FIG. 6, further, in this embodiment, an embedding structure 123 is arranged/disposed at a top corner of the partition plate 121, and the embedding structure 123 is configured to embed the partition plate 121 in a cavity wall of the premixing chamber 10. In some applications, the partition plate 121 may be independently developed and designed, to effectively simplify the mold design scheme at the pressure stabilizing chamber 11, and the embedding structure 123 also simplifies the welding process, to improve the production efficiency. In an embodiment, the embedding structure 123 may be a structure having a T-shaped or I-shaped cross-section. In some embodiments, the embedding structure 123 may be other suitable structures, or may be connected by other connection means, such as welding or integral molding.

Referring to FIG. 1 and FIG. 2 again, further, in this embodiment, the intake passages 13 may be uniformly arranged/disposed along a length direction of the pressure stabilizing chamber 11. In this embodiment, the number of intake passages 13 may be 4, and the intake passages 13 may be arranged/disposed at intervals. Taking FIG. 2 as an example, the joint (position of communication) between the premixing chamber 10 and the pressure stabilizing chamber 11 may be substantially oriented toward the position of the second intake passage 13 (numbered from left to right in FIG. 2), and the partition plate 121 may be substantially located between the first intake passage 13 and the second intake passage 13. In some applications, the positions of the partition plate 121 and the premixing chamber 10 may be adjusted according to the conditions of the engine.

Referring to FIG. 1, further, the intake end of the premixing chamber 10 (the end provided with the air inlet 101 and the exhaust gas inlet 102) extends along the length direction of the pressure stabilizing chamber 11 and is bent toward the bottom of the pressure stabilizing chamber 11, so that the position of the intake end is lower than that of the premixing chamber 10. Therefore, after oil emulsions and condensed water are generated in the premixing chamber 10, a part of the product enters the cylinder through the intake passage 13 to participate in the combustion, and another part of the product flows to the intake end at the lower position and is discharged without accumulating in the premixing chamber, to ensure the combustion performance of the engine under the long-term operation.

Referring to FIG. 3 again, in this embodiment, the air inlet 101 and the exhaust gas inlet 102 may be arranged/disposed opposite to each other on two sides of the intake end. In an embodiment, the air inlet 101 may face a front side of the intake end (or the premixing chamber 10), and the exhaust gas inlet 102 may face a back side of the intake end (or the premixing chamber 10), thereby effectively prolonging the mixing time of exhaust gas and fresh air and fully mixing the exhaust gas and fresh air.

Referring to FIG. 3 again, in this embodiment, the premixing chamber 10 may include a carbon canister desorption port 104 and a positive crankcase ventilation (PCV) valve vent 103. In an application, the carbon canister desorption port 104 may be located on the front side of the premixing chamber 10, and the PCV valve vent 103 may be located on the back side of the premixing chamber 10.

Figure 7:
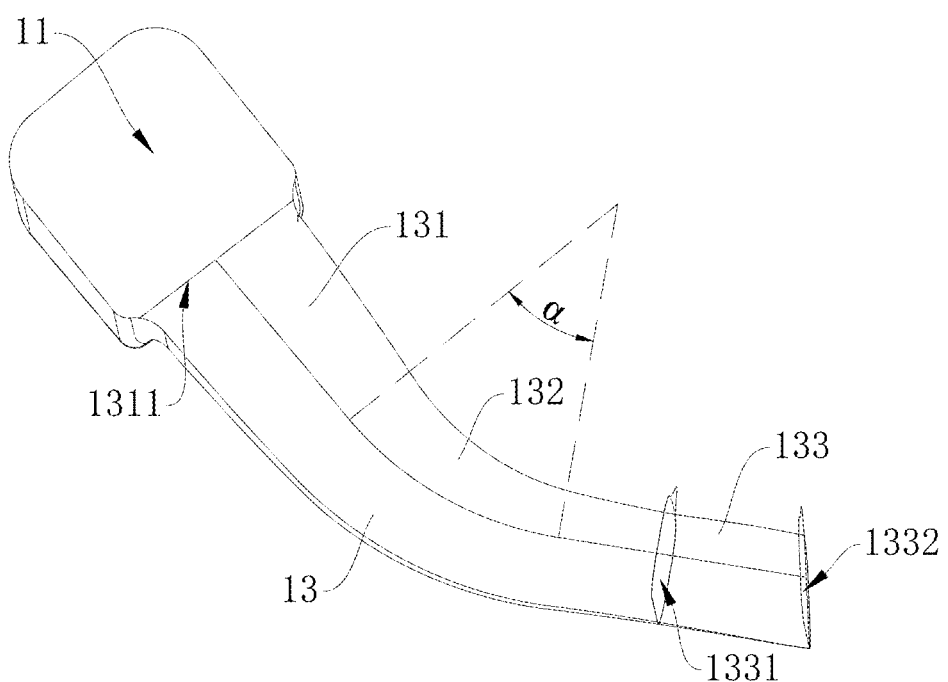
FIG. 7 is a schematic diagram of an intake passage in an intake manifold for an engine according to an embodiment of the present disclosure.

Referring to FIG. 7, in this embodiment, the intake passage 13 includes a first pipe portion 131, a circular arc portion 132, and a second pipe portion 133. The first pipe portion 131 has a front-end surface 1311 configured to connect to the pressure stabilizing chamber. The second pipe portion 133 has a rear end surface 1332 configured to connect to a cylinder. A cross-sectional area of the first pipe portion 131 gradually decreases from the front-end surface 1311 of the first pipe portion to a preset position 1331. The preset position 1331 may be located at the second pipe portion 133. Therefore, the intake passage 13 is designed as a "tapered" structure. When gas flows through the intake passage 13, the flow rate of the gas is gradually increased provided that the pressure remains unchanged, because the cross-sectional area of the intake passage 13 is gradually reduced. Meanwhile, more gas flows through the intake passage 13, and the combustion of the engine becomes more sufficient.

Still referring to FIG. 7, further, in this embodiment, the first pipe portion 131 and the second pipe portion 133 may be straight, and the lengths of the intake paths of the first pipe portion 131, the circular arc portion 132, and the second pipe portion 133 are close to each other (e.g., are approximately same). In an embodiment, the length differences between the first pipe portion 131, the circular arc portion 132, and the second pipe portion 133 may be 10% or less (based on a length of the circular arc portion 132). The length of the circular arc portion 132 is a length of a central axis of the circular arc portion 132. In an application, due to the processing technology, the first pipe portion 131, the circular arc portion 132, and the second pipe portion 133 may slightly deform after molding, so the first pipe portion 131 and the second pipe portion 133 may not be in the shape of a standard straight pipe, but is quasi-straight, which, however, does not affect the protection scope of the present disclosure.

Through this design, a better tumble effect is achieved when air enters the engine, thereby improving the combustion performance of the engine. In an application, the cross-section of the intake passage 13 may be circular, elliptical, rectangular, or of any other suitable shape. The cross-sectional shapes of the first pipe portion 131, the second pipe portion 133, and the circular arc portion 132 may be the same or different, which is not limited in this embodiment.

Referring to FIG. 7, in this embodiment, a cross-sectional area at the preset position 1331 may be 70%-80% of a cross-sectional area of the front end surface 1311 of the first pipe portion 131, and/or the cross-sectional area at the preset position 1331 may be close to a cross-sectional area of the rear end surface 1332 of the second pipe portion 133. In an application, the cross-sectional area of the intake passage 13 at the preset position 1331 may be slightly smaller than the cross-sectional area of the rear end surface 1332 of the second pipe portion 133 by an area difference of 5% or less (based on the cross-sectional area at the preset position 1331). Therefore, the flow resistance of air in the intake passage 13 can be effectively reduced, and the flow of air in the intake passage 13 can be more stable. In some other embodiments, the cross-sectional area at the preset position 1331 may be adjusted appropriately.

In an embodiment, the preset position 1331 may be located at a central position of the second pipe portion 133, and a length from the preset position 1331 to the rear end surface 1332 of the second pipe portion 133 is ⅙ of that of an intake path of the intake passage 13. Further, the circular arc portion 132 may be of an arc shape with a central angle of 30-60 degree. In an application, the above design can reduce the resistance at the front portion of the intake passage 13 and ensure the flow stabilizing effect of the rear portion of the intake passage 13, to effectively improve the stability of air flowing through the intake passage 13.

An embodiment of the present disclosure also provides an engine including an engine body and the above intake manifold 1 for the engine, which can effectively improve the combustion performance of the engine and ensure the operating state of the engine after the long-term operation. In an application, the engine may be a naturally aspirated engine or a turbocharged engine.

An embodiment of the present disclosure also provides a vehicle, including a vehicle body, and the above intake manifold 1 for an engine or the above engine.

According to the intake manifold for the engine, the engine, and the vehicle provided in the embodiments of the present disclosure, the exhaust gas of EGR and the fresh air can enter the premixing chamber 10 through the exhaust gas inlet 102 and the air inlet 101 of the premixing chamber 10 and be mixed in the premixing chamber 10. Then, the mixture enters the intake passages 13 at the bottom of the pressure stabilizing chamber 11 through the pressure stabilizing chamber 11 to participate in the combustion of the engine. This can effectively improve the mixing uniformity of the exhaust gas and fresh air, and can prevent the exhaust gas from having an excessively high temperature to affect the normal operation of the sensor. In addition, oil emulsions and condensed water generated in the premixing chamber 10 can enter the combustion chamber through the intake passages 13 at the bottom of the pressure stabilizing chamber 11 to participate in the combustion under the action of gravity, thereby effectively reducing the accumulation of oil emulsions and improving the engine performance. In addition, the design of the intake passage 13 can increase the amount of gas obtained, thereby increasing the combustion of the engine to be more sufficient. In addition, the gas can have a better tumble effect, to the improvement of the combustion performance of the engine.

The foregoing descriptions are merely some embodiments of the present disclosure, and do not limit the present disclosure. Within the spirit and principles of the present disclosure, any modifications, equivalent substitutions, improvements, etc., should be within the protection scope of the present disclosure.

IN THE DRAWINGS

1: intake manifold; 10: premixing chamber; 101: air inlet; 102: exhaust gas inlet; 103: PCV valve vent; 104: carbon canister desorption port; 11: pressure stabilizing chamber; 12: partition structure; 121: partition plate; 122: guiding structure; 122a: guiding plate; 122b: reinforcing rib; 123: embedding structure; 13: intake passage; 131: first pipe portion; 1311: front end surface; 132: circular arc portion; 133: second pipe portion; 1331: preset position; and 1332: rear end surface.

What is claimed is:

1. An intake manifold for an engine, comprising a premixing chamber, a pressure stabilizing chamber, and a plurality of intake passages, the intake passages being connected with a bottom of the pressure stabilizing chamber, a first end of the premixing chamber comprising an intake end having an air inlet, a second end of the premixing chamber being communicated with the pressure stabilizing chamber and close to a top of the pressure stabilizing chamber, and an exhaust gas inlet being disposed on a passage connected between the air inlet and the premixing chamber.

2. The intake manifold according to claim 1, wherein a partition structure is configured to increase a traveling distance of gas in the premixing chamber, and is disposed at a joint between the premixing chamber and the pressure stabilizing chamber.

3. The intake manifold according to claim 2, wherein the partition structure comprises a partition plate, a first side of the partition plate is connected with the premixing chamber, a second side of the partition plate comprises a guiding structure, and the guiding structure is configured to guide gas in the pressure stabilizing chamber to enter the intake passages.

4. The intake manifold according to claim 3, wherein the first side of the partition plate comprises a guiding surface and a connecting surface connected with the premixing chamber, and the guiding surface is configured to guide the gas in the premixing chamber to the pressure stabilizing chamber.

5. The intake manifold according to claim 4, wherein the guiding surface is of a circular arc shape.

6. The intake manifold according to claim 3, wherein the guiding structure comprises a guiding plate vertically disposed along an edge of the second side of the partition plate and facing the pressure stabilizing chamber, and comprises a reinforcing rib connected with the guiding plate and the partition plate.

7. The intake manifold according to claim 6, wherein the guiding plate and the reinforcing rib are of a circular arc shape.

8. The intake manifold according to claim 3, wherein an embedding structure configured to embed the partition plate in the premixing chamber is disposed at a top end of the partition plate.

9. The intake manifold according to claim 1, wherein the intake passages are disposed along a length direction of the pressure stabilizing chamber, and the intake end extends along the length direction of the pressure stabilizing chamber and is bent toward the bottom of the pressure stabilizing chamber.

10. The intake manifold according to claim 1, wherein the air inlet and the exhaust gas inlet are disposed on two opposite sides of the intake end.

11. The intake manifold according to claim 1, wherein the premixing chamber comprises a carbon canister desorption port and a positive crankcase ventilation valve vent.

12. The intake manifold according to claim 1, wherein one of the intake passages comprises a first pipe portion, a circular arc portion, and a second pipe portion sequentially communicated with each other, the first pipe portion has a front end surface configured to connect to the pressure stabilizing chamber, the second pipe portion has a rear end surface configured to connect to a cylinder, and a cross-sectional area of the one of the intake passages gradually decreases from the front end surface of the first pipe portion to a first position located at the second pipe portion.

13. The intake manifold according to claim 12, wherein the first pipe portion and the second pipe portion are straight or quasi-straight, and lengths of intake paths of the first pipe portion, the circular arc portion, and the second pipe portion are approximately same.

14. The intake manifold according to claim 12, wherein a cross-sectional area of the one of the intake passages at the first position is about 70%-about 80% of a cross-sectional area of the front end surface of the first pipe portion, or the cross-sectional area of the one of the intake passages at the first position is about same as a cross-sectional area of the rear end surface of the second pipe portion.

15. The intake manifold according to claim 12, wherein the first position is located at a central position of the second pipe portion, or the circular arc portion is of an arc shape with a central angle of about 30-about 60 degree.

16. An engine, comprising an engine body and an intake manifold for the engine, wherein
the intake manifold comprises a premixing chamber, a pressure stabilizing chamber, and a plurality of intake passages, the intake passages is connected with a bottom of the pressure stabilizing chamber, a first end of the premixing chamber comprises an intake end having an air inlet, a second end of the premixing chamber is communicated with the pressure stabilizing chamber and close to a top of the pressure stabilizing chamber, and an exhaust gas inlet is disposed on a passage connected between the air inlet and the premixing chamber.

17. The engine according to claim 16, wherein a partition structure is configured to increase a traveling distance of gas in the premixing chamber, and is disposed at a joint between the premixing chamber and the pressure stabilizing chamber.

18. The engine according to claim 17, wherein the partition structure comprises a partition plate, a first side of the partition plate is connected with the premixing chamber, a second side of the partition plate comprises a guiding structure, and the guiding structure is configured to guide gas in the pressure stabilizing chamber to enter the intake passages.

19. The engine according to claim 16, wherein one of the intake passages comprises a first pipe portion, a circular arc portion, and a second pipe portion sequentially communicated with each other, the first pipe portion has a front end surface configured to connect to the pressure stabilizing chamber, the second pipe portion has a rear end surface configured to connect to a cylinder, and a cross-sectional area of the one of the intake passages gradually decreases from the front end surface of the first pipe portion to a first position located at the second pipe portion.

20. A vehicle, comprising a vehicle body and an engine, the engine comprising an engine body and an intake manifold for the engine, wherein
the intake manifold comprises a premixing chamber, a pressure stabilizing chamber, and a plurality of intake passages, the intake passages is connected with a bottom of the pressure stabilizing chamber, a first end of the premixing chamber comprises an intake end having an air inlet, a second end of the premixing chamber is communicated with the pressure stabilizing chamber and close to a top of the pressure stabilizing chamber, and an exhaust gas inlet is disposed on a passage connected between the air inlet and the premixing chamber.

* * * * *